March 12, 1946.  B. LEVINSON  2,396,271
BUOYANT ELECTRODE
Filed Jan. 27, 1943
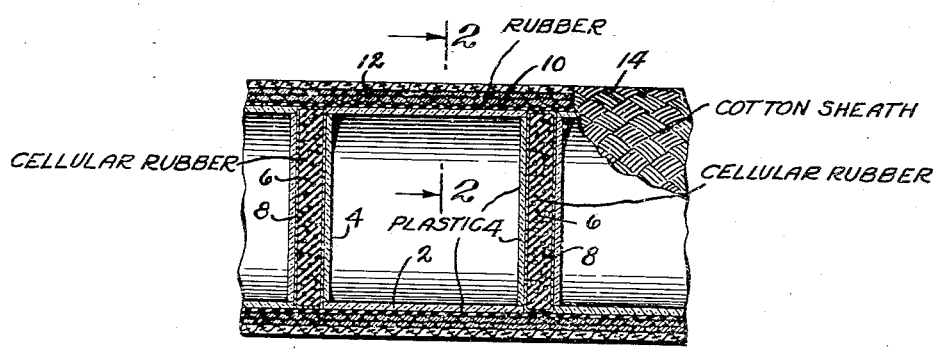
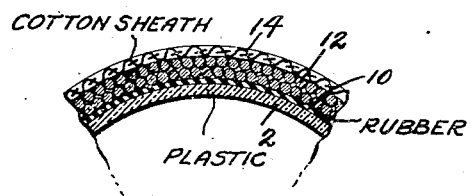
INVENTOR
Benjamin Levinson,
BY
James G. Bethell.
ATTORNEY Patented Mar. 12, 1946

2,396,271

UNITED STATES PATENT OFFICE 2,396,271

BUOYANT ELECTRODE

Benjamin Levinson, East Paterson, N. J., assignor to The Okonite-Callender Cable Company, Incorporated, Paterson, N. J., a corporation of New Jersey Application January 27, 1943, Serial No. 473,685

4 Claims. (Cl. 174—111)

This invention relates to an improvement in buoyant electrodes to be employed in connection with buoyant electric cables, the weight to volume ratio of both the electrode and cable being such as to enable the same to float in sea water, for example.

One of the objects of my invention is to provide a buoyant electrode which is new and novel, particularly with respect to the center construction of the electrode.

More specifically my invention is directed to an improvement in buoyant electrodes wherein the center comprises a plurality of hermetically sealed plastic cells spaced from each other by suitable spacers of rubber, for example. These cells being composed of a plastic material are non-corrosive, will not absorb water, are readily hermetically sealed and may be produced in large quantities rapidly and inexpensively.

I have found, too, that the resistance to crushing of these cells is high but, if desired, the cells may be kept under a relatively high internal pressure, say, for example, 75 to 100 pounds to the square inch.

In the accompanying drawing:

Fig. 1 is a fragmentary showing in sectional elevation of one embodiment of my invention; and Fig. 2 is a cross section through Fig. 1 on the line 2—2.

Referring to the drawing in detail: 2 designates a plastic cylinder such as a cylinder of cellulose nitrate, hermetically sealed by plastic heads 4. Sealing of the cylinder may be accomplished by using the solvent of the material, so that the material of the cylinder and of the heads 4 flow together, or a cement may be used. This sealed cylinder provides a center or core cell, and a plurality of these cells are disposed along the center of the electrode, adjacent cells being separated from each other by spacers 6. These spacers may be wooden discs, inflated rubber cylinders, or they may be of cellular rubber, as illustrated, in which latter case each spacer is preferably enclosed in a gas impervious skin or sheath 8.

The assembly of alternate cells and spacers is enclosed in a flexible water impervious sheath 10, such as a sheath of rubber, for example, and the conductor 12 of the electrode is laid up about this sheath. The conductor is conveniently composed of layers of bare metal strands laid up in opposite directions about the sheath 10. The strands may be copper, aluminum, etc.

The free end of the electrode is hermetically sealed in any suitable fashion, while the inner end is attached in watertight fashion to the buoyant cable with which the electrode is to be used. These detail features constitute no part of the invention and hence have not been illustrated.

In the construction so far described it will be appreciated that with the electrode in use the conductor strands are in direct contact with the water. Under such conditions considerable corrosion of the conductor strands takes place, so in order to retard, as much as possible, such corrosion of the conductor strands, I apply about them braid sheath 14 of cotton, linen, nylon or similar water permeable sheath. It has been found that such a sheath retards corrosion of the conductor strands and yet, inasmuch as the water permeates the same, a good electrically conducting path radially of the electrode is provided from the electrode conductor strands to the medium in which the electrode is floating.

It has been found that the plastic cells above described are excellently adapted for this type of electrode, in that they are highly resistant to crushing, yet, at the same time, they are light in weight. As above noted, it may be desirable in some instances to maintain the plastic cells under a fairly high internal pressure, an internal pressure of say 75 to 100 pounds per square inch gauge, for example, in order to increase the resistance of the cells to crushing from externally applied forces.

It will be appreciated from all of the foregoing, of course, that with the two ends of the electrode hermetically sealed, and with the sheath 10 enclosing the center or core assembly, entry of water to the center of the electrode is prevented, while by applying the bare conductor strands about this sheath and enclosing them in a water permeable sheath, as above described, a good radially electrically conducting path is provided from the conductor strands to the medium, such as sea water, in which the electrode is supported. It will be appreciated, however, that even though the sheath 10 be punctured or damaged, the electrode can still be operated, and the sea water will not affect the core members inasmuch as the same are corrosion-proof and will not absorb water.

It is understood, of course, as above pointed out, that the weight to volume ratio of the electrode is such as to enable the same to float in sea water, for example.

It is to be understood, also, that changes may be made in the details of construction and arrangement of parts herein illustrated and described within the spirit and scope of the invention.

What I claim is:

1. An electrode the weight to volume ratio of which is such as to enable the same to float in a medium such as sea water, said electrode comprising a plurality of hermetically sealed core cells of plastic material, an enclosing flexible water impervious sheath, conductor strands laid up about said sheath, and an enclosing non-metallic water permeable sheath about the conductor, whereby with the electrode afloat an electrically conducting path is provided from the conductor strands radially of the electrode to the exterior of said water permeable sheath.

2. An electrode the weight to volume ratio of which is such as to enable the same to float in a medium such as sea water, said electrode comprising a plurality of hermetically sealed core cells of plastic material, rubber spacers intermediate adjacent cells, an enclosing rubber sheath, conductor strands of bare wire laid up about said sheath, and a non-metallic, water permeable sheath about the conductor, whereby with the electrode afloat an electrically conducting path of low resistance is provided from the conductor strands radially of the electrode to the exterior of the said water permeable sheath.

3. An electrode the weight to volume ratio of which is such as to enable the same to float in a medium such as sea water, said electrode comprising a plurality of hermetically sealed core cells of plastic material, spacers between adjacent cells, a rubber sheath enclosing said cells and spacers, conductor strands laid up about said sheath, and a braid sheath of non-metallic material enclosing the said conductor strands, said braid sheath being water permeable so that with the electrode afloat a low resistance path is provided from the conductor strands radially of the electrode to the exterior of said braid sheath.

4. An electrode, the weight to volume ratio of which is such as to enable the same to float in a medium such as sea water, said electrode comprising a plurality of hermetically sealed core cells of plastic material, spacers intermediate adjacent cells, an enclosing water impervious sheath conductor strands laid up about this assembly, and an enclosing non-metallic water permeable sheath about the conductor, whereby with the electrode afloat an electrically conducting path is provided from the conductor strands radially of the electrode to the exterior of the said water permeable sheath.

BENJAMIN LEVINSON.